(12) United States Patent
Hervig

(10) Patent No.: US 6,241,639 B1
(45) Date of Patent: Jun. 5, 2001

(54) PEDAL WITH ADJUSTABLE PIVOT STOPS

(76) Inventor: Dana P. Hervig, 1450 102nd St. East, Inver Grove Heights, MN (US) 55077

( * ) Notice: Subject to any disclaimer, the term of this patent is extended or adjusted under 35 U.S.C. 154(b) by 0 days.

(21) Appl. No.: 09/346,362

(22) Filed: Jul. 1, 1999

Related U.S. Application Data

(63) Continuation of application No. 08/511,677, filed on Aug. 7, 1995, now Pat. No. 5,628,710, and a continuation-in-part of application No. 08/311,563, filed on Sep. 23, 1994, now Pat. No. 5,449,332.

(51) Int. Cl.[7] ............................. A63B 22/06; F16H 7/22
(52) U.S. Cl. ........................................ 482/57; 74/594.4
(58) Field of Search .................................. 482/57, 71, 51, 482/58–65; 74/594.1, 594.2, 594.4, 594.7

(56) References Cited

U.S. PATENT DOCUMENTS

| 4,033,199 | 7/1977 | Bouder | 74/594.5 |
| 4,599,915 | 7/1986 | Hlavac | 74/594.4 |
| 4,893,523 | 1/1990 | Lennon | 74/594.6 |
| 4,973,046 | 11/1990 | Maxwell | 74/594.4 |
| 5,142,938 | 9/1992 | Sampson | 74/594.4 |
| 5,449,332 | 9/1995 | Hervig | 482/57 |
| 5,628,710 | 5/1997 | Hervig | 482/57 |

*Primary Examiner*—Stephen R. Crow

(57) ABSTRACT

A pedal having a pedal shaft having first and second oppositely disposed ends, and an axis extending through the first end and the second end, the first end being connectable to a bicycle crank; a pedal housing rotatably mounted to said shaft about the axis of said shaft; a pedal frame pivotally mounted on said housing along a longitudinal axis substantially perpendicular to the axis of said shaft; and adjustable pivot stops for regulating the degrees of longitudinal pivoting of said pedal frame relative to the housing. The pedal can be referred to as a rocking pedal since it can provide an unobstructed or a cushion dampened rocking motion on a heel to toe axis.

13 Claims, 3 Drawing Sheets

PEDAL WITH ADJUSTABLE PIVOT STOPS

The present application is a continuation-in-part of U.S. Pat. Ser. No. 08/511,677, Aug. 7, 1995, U.S. Pat. No. 5,628,710 and continuation-in-part of U.S. Pat. Ser. No. 08/311,563, Sep. 23, 1994, U.S. Pat. No. 5,449,332

BACKGROUND OF THE INVENTION

Technical Field

This invention relates to a pedal for bicycles and exercise equipment which pivots on a heel to toe axis that extends through longitudinal support arms to provide lateral adjustability during pedaling. The most common bicyle pedals in the United States are not laterally adjustable; they have a pedal foot surface to pedal crank arm inside angle fixed at approximately 90 degrees. In U.S. Pat. Nos. 5,449,332 and 5,628,710 Hervig shows pedals that provide lateral adjustability through a manufacturer determined pivot range; These pedals pivot about a longitudinal axis with minimal bearing friction resistance and the selected addition of resistance provided from cushion pads of different densities. The original pedals shown by Hervig allowed pedal foot surface to pedal crank arm angle adjustments according to cyclist foot inputs in a range of approximately plus 6 degrees or minus 6 degrees from the standard 90 degree inside angle formed between the pedal foot surface and the pedal crank arm. The presently disclosed modification of user adjustable pivot stops can be applied to the previously disclosed styles of pedals shown by Hervig. In the presently disclosed pedal, the limits of lateral adjustment can be set to a pivoting range within plus 6 degrees or minus 6 degrees from the standard 90 degree inside angle. For example, the pedal can be set to pivot from 3 degrees of eversion to 1 degree of inversion, or it can be set to a specific lateral angle of adjustment such as being fixed at 4 degrees of eversion.

The lateral positioning range can be altered by an allen wrench adjustment of set screws on the pedal frame surface. Two set screws are put into threaded set screw holes located on the pedal frame perpendicular to the longitudinal axis. The distance between the inner most ends of the set screws (or the set screw holes if the set screws are retracted) and the contact portions of the pedal shaft housing will determine the limits of lateral pivoting. The disclosed pedal with set screws is designed to be used in conjunction with the cushioning means of the previous pedals shown by Hervig.

By using an allen wrench to turn the set screws into the pedal, the cyclist can limit the maximums and minimums of foot inversion (rotating the foot to lower the arch) and eversion (rotating the foot to raise the foot's arch). On presently shown pedals with side by side set screws, the set screw furthest from the threaded end of the pedal shaft can prevent eversion while the set screw closest to the threaded end can prevent inversion. On pedals with set screws shown above and below the pedal shaft, the lower set screw can prevent eversion while the upper set screw can prevent inversion. For example, with a manufacturer provided range of plus or minus 6 degrees of lateral adjustability, turning the eversion set screw approximately ¼ way the maximum distance between the inner most end of the set screw hole and the shaft sleeve (i.e. with the shaft sleeve fully pivoted away from the set screw hole) would reduce the pedal eversion maximum from 6 degrees to 3 degrees; The maximum relative inside angle between the foot contact surface of the pedal and the pedal crank arm would be reduced from 96 degrees to 93 degrees. Turning this screw approximately ½ way of this distance would prevent eversion since the pedal would be limited to a 90 inside degree pedal surface to pedal crank arm inside angle. Turning the eversion screw ¾ way would move the foot contact surface of the pedal to a minimum 3 degrees of inversion and would prevent pedal eversion. Turning the eversion screw all the way down would hold the pedal to 6 degrees of inversion. Turning the inversion set screw ¼ way down would prevent the pedal from inverting more than 3 degrees; ½ way down would prevent inversion; ¾ way down would require 3 or more degrees of eversion; and turning the screw all the way down would hold the pedal at 6 degrees of eversion.

By modifying a pedal according to the principles of Hervig's U.S. Pat. Nos. 5,449,332 and 5,628,710 with the described set screws, it can be understood that the presently described pedal can, by adjustment of both set screws, permit an infinite number of reduced ranges of cushioned lateral adjustability within the maximums of lateral adjustability provided by the original invention. Also, by using the above described set screws in combination, it is possible to set and hold the pedal to a specific lateral adjustment angle.

SUMMARY OF THE INVENTION

A pedal includes a shaft housing having a coaxial rotatable shaft within that is connectable to a bicycle pedal crank. The shaft housing rotates about the pedal shaft with ball or precision bearings. The housing also provides longitudinal extensions in the form of arms or threaded holes in which screws can be inserted to act as arms to provide lateral adjustment on a heel to toe axis. Any number of styles of pedal frames (i.e. clipless, street, or stationary) can be used to adapt to the described longitudinal extensions of the shaft housing. Left and right portions of the pedal frame are generally bisected by the longitudinal axis so the lateral adjustment pivot point is felt in the middle of the foot. At equal distances from opposite sides of this bisection, lateral adjustment pivot stops are placed that allow a cyclist to easily control the spacing between the pedal frame and the pedal housing to control the pivoting amount or the fixation of lateral adjustability. The use of cushioning pads between the pedal frame and the pedal housing provides lateral adjustability with a selected amount of resistance to it and keeps dirt from compromising internal pedal components.

BRIEF DESCRIPTION OF THE DRAWINGS

The invention will be better understood, and objects other than those set forth above will become apparent when consideration is given to the following detailed description thereof. Such description makes reference to the drawings wherein.

DETAILED DESCRIPTION OF THE INVENTION

Figure 1:
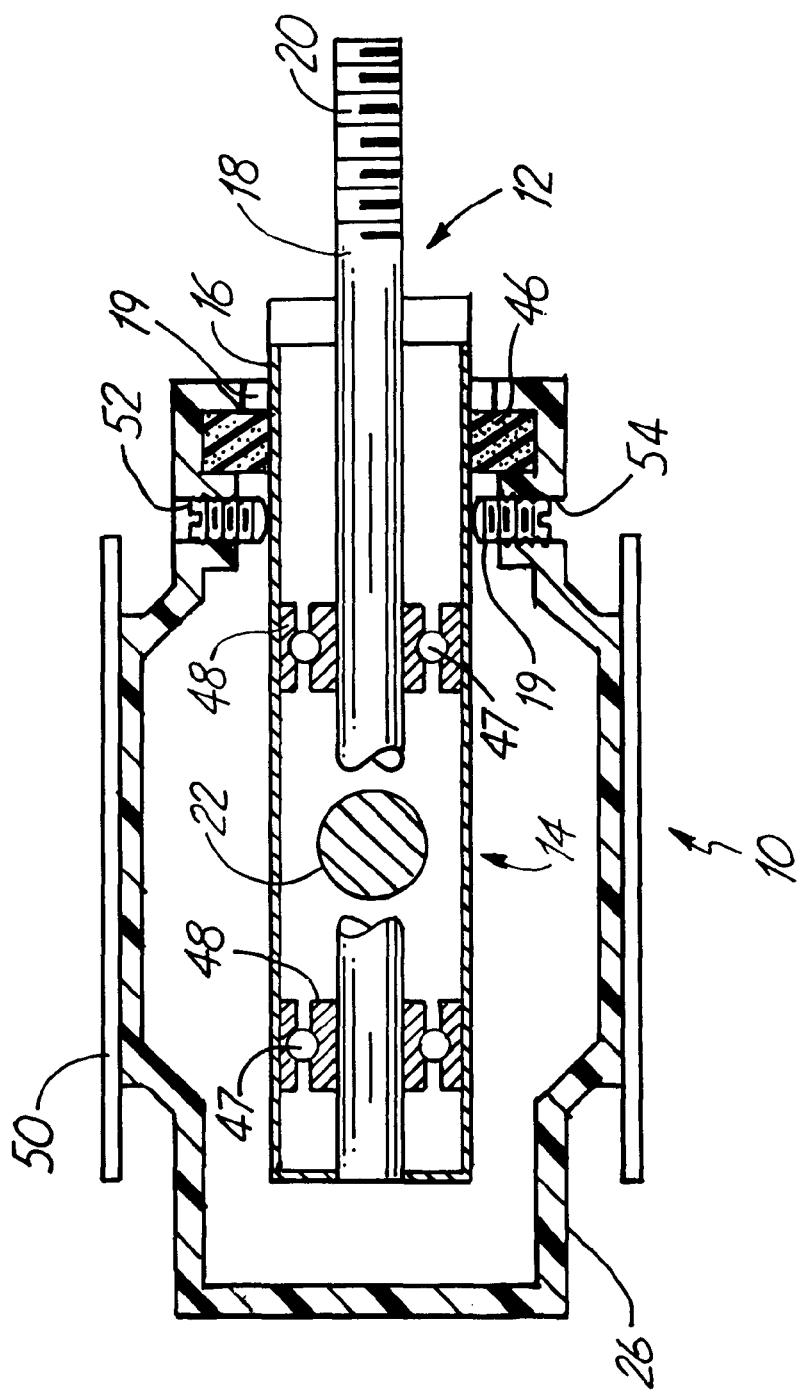
FIG. 1 is a sectional view of a clipless pedal.

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Figure 2:
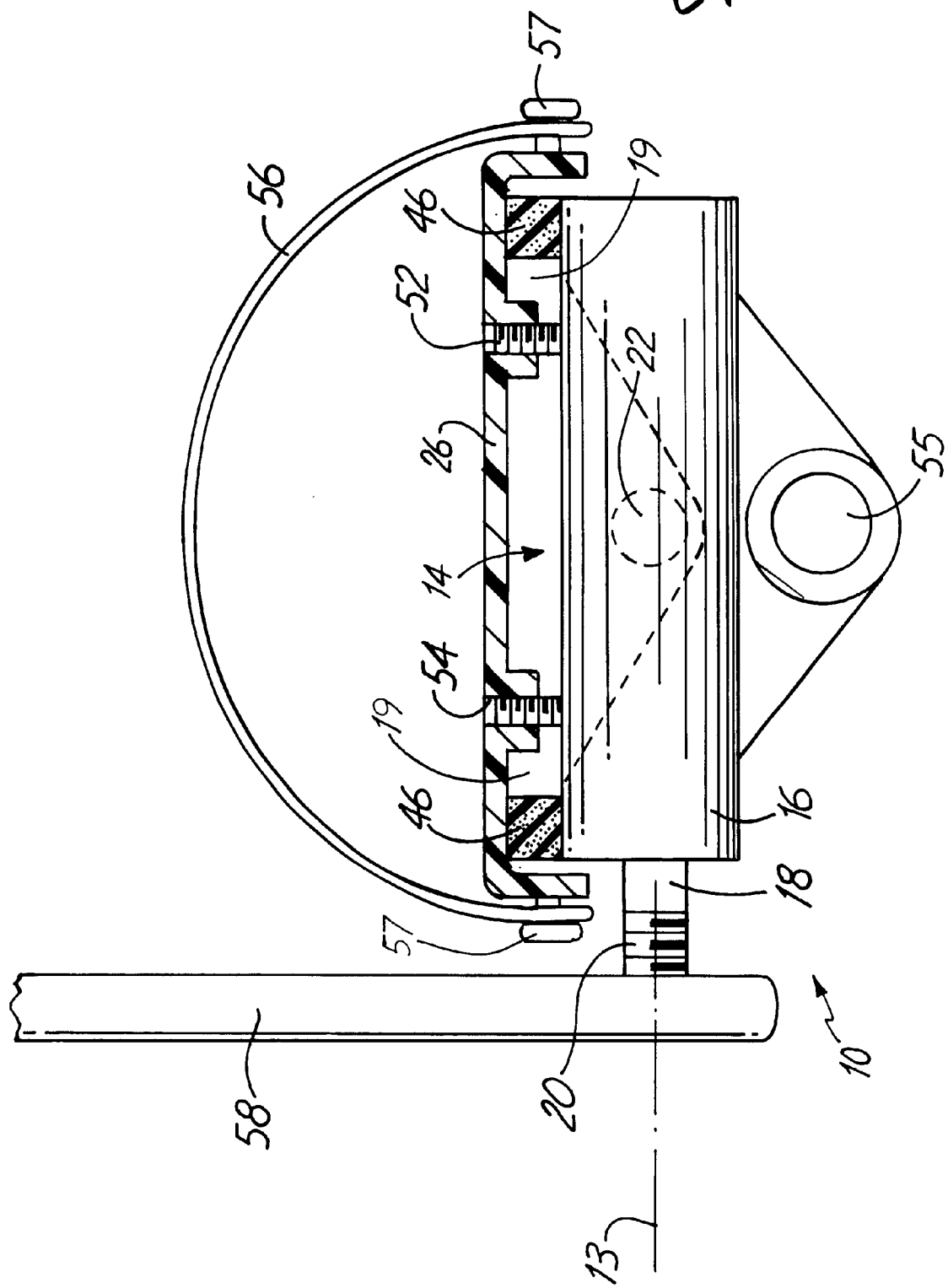
FIG. 2 is a sectional view of a stationary bike pedal.
Figure 3:
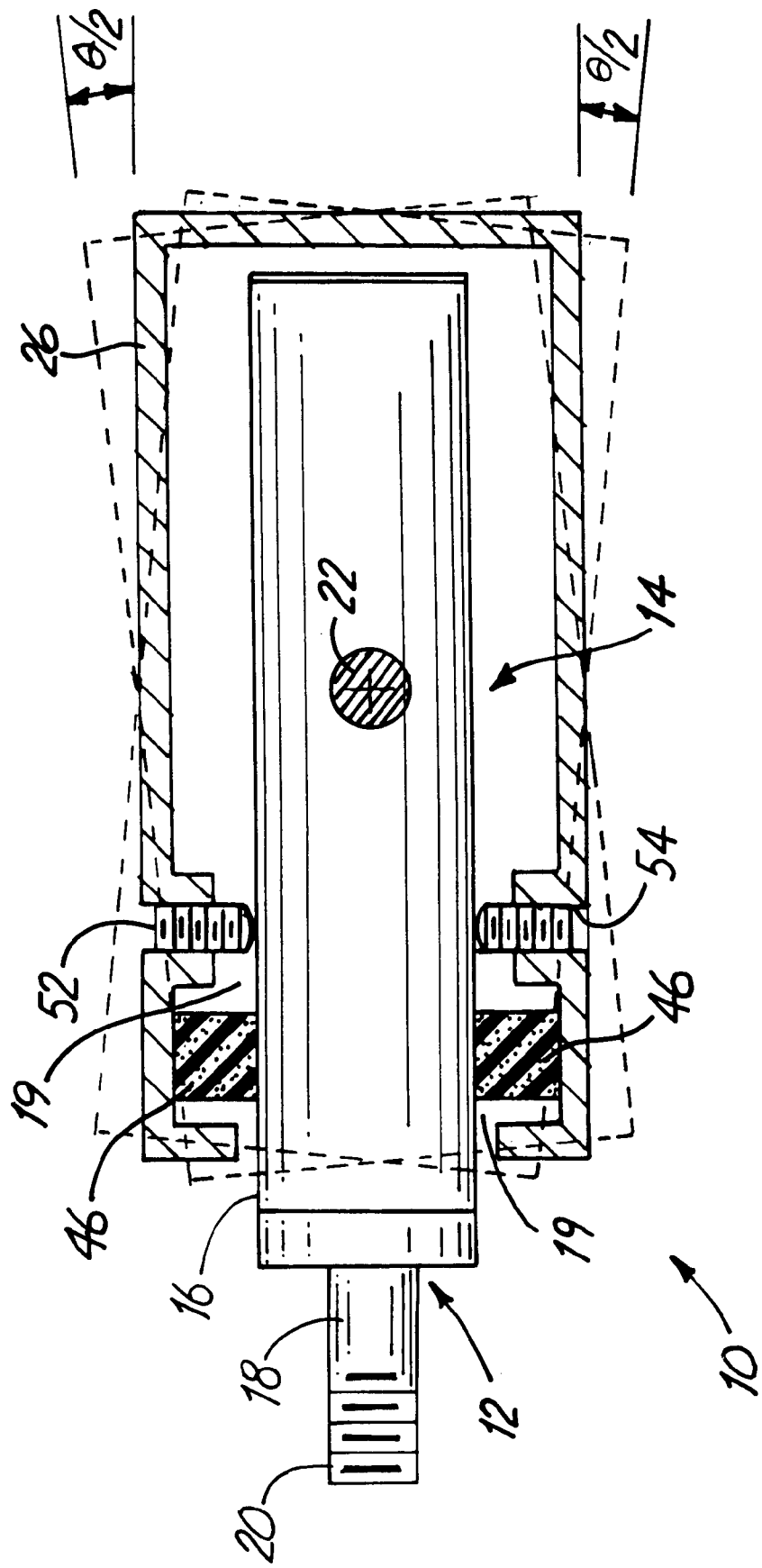
FIG. 3 is a sectional view of a road pedal.

Referring now to FIGS. 1–3, the reference numeral 10, generally designates an embodiment of a pedal with adjustable pivot stops. The pedal may be referred to as a "rocking pedal" and includes a pedal housing 16 having a rotational region 12 being provided for allowing the pedal 10 to freely rotate about the lateral rotational axis 13 and a longitudinal pivoting region 14 being provided for allowing adjustment on a heel to toe axis. The rotational region 12 includes pedal housing 16 and a shaft 18. The shaft 18 is made of stainless steel but can also be made of titanium or of another hardened metal as currently used in the manufacture of bicycle pedals. Shaft 18 has a threaded end 20 which is connectable to a bicycle crank. Shaft 18 and pedal housing 16 rotate relative to each other on a sliding means such as precision bearings or ball bearings 47 with bearing housings 48 or some similar rotation mechanism which is commonly known in the art and used in the manufacture of bicycle pedals.

The pedal housing 16 is cast and machined aluminum or injected polypropolene with 10% fiberglass and includes two support arms 22 which extend perpendicularly from opposite sides of housing 16 to support pedal frame 26 and provide for longitudinal pivoting region 14. The pedal frame 26 of FIG. 1 is machined aluminum or injection molded of a composite plastic in two halves that are joined together with stainless steel screws (not shown) around pedal housing 16. The main contact points between pedal frame 26 and pedal housing 16 in FIG. 1 are support arms 22. Between support arms 22 and the inner portions of pedal frame 26 they contact is applied a lubricant i.e. grease to reduce friction and promote part longevity. Pedal frame 26 is made to have clearances 19 between itself and pedal housing 16 so that pedal frame 26 may pivot for lateral adjustment on support arms 22. The use of commonly available bearings for longitudinal pivoting is possible, but not shown here since the chosen materials are machined smooth and of sufficient hardness for reasonable longevity. Pivot maximums are determined by the manufactured clearances 19. Clearances 19 allow placement of adhesive backed cushion pads 46; these maximums will allow approximately 6 degrees of eversion and 6 degrees of inversion. Cushion pads 46 are die cut from adhesive back Poron TM brand cellular urathane, although springs, variable displacement airbags, etc. can be substituted to provide a similar effect.

The longitudinal axis pivoting maximums can be altered by the adjustment of the pedal user by turning set screws 52 with an allen wrench. Set screws 52 are also stainless steel and are equipped with patches (not shown) which are commonly available as an addition to the screw from fastener retailers. The patch provides some resistance to turning the set screw 52 so that it will hold any adjustment applied by the pedal user. Set screws 52 are inserted into the pedal frame 26 through threaded holes 54 placed on opposite ends of pedal frame 26. Pedal frame 26, cushion pads 46, or set screws 52 will contact pedal housing 16 to determine the maximums of longitudinal axis pivoting.

The top and bottom contact surfaces of pedal frame 26 in FIG. 1 provide connection hardware 50 for the attachment of a cyclist's shoe. The connection hardware 50 permits free vertical axis pivoting or float for toe in and toe out foot positioning. Thus, the pedal in FIG. 1 permits foot adjustment on three axis—lateral, longitudinal and vertical. A variety of clipless pedal hardware attachments are commonly available from pedal manufacturers such as from Shimano, Wellgo, Look, Speedplay etc. The exercise bike pedal shown in FIG. 2 has a pedal frame 26 that is injection molded polypropolene with 10% fiberglass. Two opposite upper holes in frame 26 permit it to be attached via shoulder screws (not shown) to the oppositely diposed support arms 22. Foot strap 56 is held by hooks 57 to aid a cyclist in keeping his or her foot on the pedal frame 26. Two opposite lower holes in frame 26 allow attachment of an iron counter weight 55 that is used to prevent the weight of strap 56 from rotating the upper surface of pedal frame 26 downwards. Weight 55 orients the pedal for easy foot entry.

While the invention has been described in conjunction with specific embodiments thereof, it is evident that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A pedal comprising;
   (a) a pedal shaft having first and second oppositely disposed ends, and an axis extending through the first end and the second end, the first end being connectable to a bicycle crank;
   (b) pedal housing rotatably mounted to said shaft about the axis of said shaft;
   (c) pedal frame pivotally mounted on said housing on a longitudinal axis substantially perpendicular to the axis of said shaft;
   (d) adjustable pivot stops for regulating the degrees of pivoting on said longitudinal axis of said pedal frame relative to the housing, said pivot stops comprising two set screws inserted through two threaded holes in the pedal frame; wherein said screws may reduce or increase the distance between said housing and the pedal frame.

2. The pedal according to claim 1, wherein said pedal frame provides freedom for toe in and toe out pivoting via an attachment means on the pedal frame for connection to a cyclist's shoe.

3. The pedal according to claim 1, wherein a cushioning/dampening means between the housing and the pedal frame provides cushioning when the pedal frame is pivoted relative to the housing.

4. The pedal according to claim 1, wherein the longitudinal axis pivoting movement is between about 1 and 24 degrees.

5. The pedal according to claim 1, wherein the pedal frame has a top contact surface for connection to a cyclist's shoe and a lower contact surface for connection to a cyclist's shoe.

6. The pedal according to claim 1, wherein the pedal frame provides attachment for a counterweight and provides hooks for attachment of a pedal strap.

7. An exercise machine comprising at least one pedal; said pedal comprising:
   (a) a pedal shaft having first and second oppositely disposed ends, and an axis extending through the first end and the second end, the first end being connectable to a bicycle crank;
   (b) pedal housing rotatably mounted to said shaft about the axis of said shaft;
   (c) pedal frame pivotally mounted on said housing on a longitudinal axis substantially perpendicular to the axis of said shaft;
   (d) adjustable pivot stops for regulating the degrees of pivoting on said longitudinal axis of said pedal frame relative to the housing, said pivot stops comprising two set screws inserted through two threaded holes in the pedal frame; wherein said screws may reduce or increase the distance between said housing and the pedal frame.

8. The pedal according to claim 7, wherein said pedal frame provides freedom for toe in and toe out pivoting via an attachment means on the pedal frame for connection to a cyclist's shoe.

9. The pedal according to claim 7, wherein a cushioning/dampening means between the housing and the pedal frame provides cushioning when the pedal frame is pivoted relative to the housing.

10. The pedal according to claim 7, wherein the longitudinal axis pivoting movement is between about 1 and 24 degrees.

11. The pedal according to claim 7, wherein the pedal frame has a top contact surface for connection to a shoe and a lower contact surface for connection to a shoe.

12. The exercise machine according to claim 7, which is a bicycle.

13. The exercise machine according to claim 7, which is a stationary bicycle.

\* \* \* \* \*